United States Patent

Rossi et al.

[11] Patent Number: 5,807,949
[45] Date of Patent: Sep. 15, 1998

[54] POLYMERS AND ADDITIVE COMPOSITIONS

[75] Inventors: Albert Rossi, Warren; John Earl Chandler, Edison, both of N.J.; Robert Barbour, Harwell, United Kingdom

[73] Assignee: Exxon Chemical Patents Inc., Wilmington, Del.

[21] Appl. No.: 960,092

[22] Filed: Oct. 24, 1997

Related U.S. Application Data

[63] Continuation of Ser. No. 723,626, Oct. 3, 1996, abandoned, which is a continuation of Ser. No. 307,656, filed as PCT/EP93/00633, Mar. 17, 1993, published as WO93/19106, Sep. 30, 1993, abandoned.

[30] Foreign Application Priority Data

Mar. 19, 1992 [GB] United Kingdom .................. 9205996

[51] Int. Cl.⁶ .............................. C08F 10/14; C10L 1/16
[52] U.S. Cl. ................... 526/348.3; 44/459; 526/116; 526/156; 526/348.2; 585/10; 585/12
[58] Field of Search ................. 526/348.2, 116, 526/156, 348.3; 585/10, 12; 44/459

[56] References Cited

U.S. PATENT DOCUMENTS

| | | | |
|---|---|---|---|
| 2,895,915 | 7/1959 | Hewett | 585/10 |
| 3,252,771 | 5/1966 | Clough | 585/10 |
| 3,767,561 | 10/1973 | Rossi | 208/37 |
| 3,790,358 | 2/1974 | Rossi | 585/11 |
| 3,920,622 | 11/1975 | Song | 526/347 |
| 4,022,590 | 5/1977 | Morduchowitz | 585/9 |
| 4,132,663 | 1/1979 | Heilman | 585/12 |
| 4,255,159 | 3/1981 | Miller | 44/435 |
| 4,962,262 | 10/1990 | Winter | 526/160 |

*Primary Examiner*—Fred Zitomer
*Attorney, Agent, or Firm*—Ohlandt, Greeley, Ruggiero & Perle

[57] ABSTRACT

Homo- or co-polymers derived from one or more alpha-olefins having a number average molecular weight of up to 15,000 and an isotacticity of 75% or greater, and their use as Cold Flow Improvers in crude, fuel or lubricating oil.

3 Claims, No Drawings

POLYMERS AND ADDITIVE COMPOSITIONS

This is a continuation of application Ser. No. 08/723,626 filed Oct. 3, 1996, abandoned, which is a continuation of application Ser. No. 08/307,656, filed as PCT/EP93/00633 Mar. 17, 1993, published as WO93/19106 Sep. 30, 1993, abandoned.

This invention relates to polymers and their use as additives in crude oil, lubricating oil and fuel oil.

It is known that wax separates from crude oil, lubricating oil and fuel oil as their temperature is lowered, thus reducing their ability to flow. It is also known to use additives (called "Cold Flow Improvers") to improve the ability of the oil to flow, and a number of such additives are described in the art. A Cold Flow Improver acts as a wax crystal modifier when blended with waxy mineral oil by modifying the size and shape of the wax crystals therein and reducing the adhesive forces between the crystals and between the crystals and the oil to permit the oil to remain fluid at a lower temperature.

Examples of known additives are polymeric materials based on or derived from alpha-olefins, for example as described in U.S. Pat. Nos. 2,895,915; 3,252,771; 3,252,772; 3,767,561; 3,790,358; 4,022,590; 4,132,663; 4,255,159 and 3,920,622.

EP-A-0,317,240 describes an a-olefinic random copolymer with specific physical properties comprising 70%–99.9% by weight of an alpha-olefin component having 5 to 10 carbon atoms and 0.1%–30% of an α,ω-nonconjugated diene component having 6–20 carbon atoms. Such a copolymer exhibits improved mouldability and high vibration-damping performance at high temperature.

U.S. Pat. No. 632,416 describes interpolymers composed of ethylene and a small weight percent of higher olefinic hydrocarbons having 5 to 18 atoms per molecule. Such polymers are described as useful for mouldings, pipes and wire coatings.

UK Patent No. 1,303,074 describes pour point depressants for middle distillate fuel oils being copolymers essentially only of ethylene and at least one higher olefin, containing 1.1 to 30 molar proportions of ethylene per molar proportion of straight chain $C_{12}$ to $C_{22}$ alpha-olefin, and having a number average molecular weight of 1,000 to 50,000.

Further WO-A-9111488 describes inter alia the use, as a wax crystal modifier in a fuel oil, of a copolymer derived from ethylene and at least one alpha-olefin of the formula $CH_2=CHR^1$ wherein $R^1$ represents an alkyl group having from 1 to 18 carbon atoms, at least 30% of the chains of which polymer have terminal ethenylidene unsaturation, the polymer having a number average molecular weight in the range of from 300 to 15000 and a molar ethylene content in the range of from 40 to 90%, the polymer being obtainable by polymerisation in the presence of a metallocene catalyst.

However, both UK 1,303,074 and WO-A-91/11488 indicate that ethylene alpha olefin copolymers with lower ethylene contents show reduced potency as cold-flow improving additives for distillate fuel oils. Furthermore, the incorporation of high levels of ethylene into such polymers reduces their resultant tacticity. Tacticity, in accordance with the nomenclature proposed by G. Natta in J. Polymer Science 16, 143, 1955 refers to the relative stereochemistry of adjacent chiral centres along a polymer backbone. Ethylene, lacking a pro-chiral centre, cannot contribute chiral centres to the backbone and serves only to disrupt the pattern of chiral centres supplied by the alpha-olefin comonomer, and hence to disrupt the tacticity of the polymer.

U.S. Pat. No. 3,876,722 describes hydrocarbon polymers of number average molecular weight 500–125,000 comprising $C_{20}$ to $C_{40}$ alpha-olefins, suitable for improving the low temperature flowability of residual fuels. Such polymers may preferably also comprise one or more comonomers of $C_3$ to $C_{18}$ alpha-olefins which serve only to disrupt the degree of order of the polymer, resulting in an increase of the polymers' ability to improve the flow characteristics of residual fuels.

Surprisingly, it has now been discovered that polymers derived from certain alpha-olefin monomers, having a combination of high levels of isotacticity i.e. where high proportions of the chiral centres along each polymer backbone have the same configuration, low molecular weights and specific side chain lengths demonstrate outstanding properties when used as cold flow improvers. In particular, these polymers show improved solubility and cold flow performance as wax crystal modifiers in the oils of this invention and demonstrate good handling characteristics for use in additive packages.

The polymers of this invention are particularly noteworthy for having high levels of isotacticity. Thus, whilst ethylene may be advantageously incorporated as a comonomer in these polymers, such incorporation should not exceed a level where tacticity of the polymer is substantially diminished.

In a first aspect therefore, the invention provides a homo- or co-polymer having a number average molecular weight of up to 15,000 and an isotacticity of 75% or greater; said homopolymer being derived from an alpha-olefin monomer of formula (I):

$$CH_2=CHR^1 \qquad (I)$$

wherein $R^1$ is an aliphatic hydrocarbyl group of up to 16 carbon atoms with the proviso that $R^1$ is not isobutyl or n-hexadecyl; said copolymer being derived essentially from a first alpha-olefin monomer of formula (I) above wherein $R^1$ is an aliphatic hydrocarbyl group of up to 16 carbon atoms and one or more additional alpha-olefin monomers each independently of formula (II):

$$CH_2=CHR^2 \qquad (II)$$

wherein $R^2$ is hydrogen or an aliphatic hydrocarbyl group of up to 16 carbon atoms and different from $R^1$, with the proviso that when $R^2$ is hydrogen the resulting copolymer does not contain more than 40 mole % of the ethylene monomer, and that, when $R^2$ is not hydrogen, $R^1$ and $R^2$ do not consist essentially of n-hexadecyl and ethyl groups, or do not consist essentially of isobutyl and either n-butyl or n-decyl groups.

In a second aspect, the invention provides a composition comprising a major proportion of a lubricating oil or fuel oil and a minor proportion of an additive comprising a homo- or co-polymer having a number average molecular weight of up to 15,000 and an isotacticity of 75% or greater; said homopolymer being derived essentially from an alpha-olefin monomer of formula (I)

$$CH_2=CHR^1 \qquad (I)$$

wherein $R^1$ is an aliphatic hydrocarbyl group; said copolymer being derived essentially from a first alpha-olefin monomer of formula (I) wherein $R^1$ is as defined above and one or more additional alpha-olefin monomers each independently of formula (II):

$$CH_2=CHR^2 \qquad (II)$$

wherein R² is hydrogen or an aliphatic hydrocarbyl group different from R¹, with the proviso that when R² is hydrogen the resulting copolymer does not contain more than 40 mole % of the ethylene monomer.

In a third aspect, the invention provides a composition comprising a major proportion of a crude oil, lubricating oil or fuel oil and a minor proportion of an additive comprising a homo- or co-polymer having a number average molecular weight of up to 15,000 and an isotacticity of 75% or greater; said homopolymer being derived from an alpha-olefin monomer of formula (I):

wherein R¹ is an aliphatic hydrocarbyl group of up to 16 carbon atoms with the proviso that R¹ is not n-hexadecyl; said copolymer being derived essentially from a first alpha-olefin monomer of formula (I) above wherein R¹ is an aliphatic hydrocarbyl group of up to 16 carbon atoms and one or more additional alpha-olefin monomers each independently of formula (II):

wherein R² is hydrogen or an aliphatic hydrocarbyl group of up to 16 carbon atoms and different from R¹, with the proviso that when R² is hydrogen the resulting copolymer does not contain more than 40 mole % of the ethylene monomer, and that, when R² is not hydrogen, R¹ and R² do not consist essentially of n-hexadecyl and ethyl groups.

In a fourth aspect, the invention provides the use, for improving the cold flow properties of lubricating oil or fuel oil, of an additive defined in the second aspect.

In a fifth aspect, the invention provides the use, for improving the cold flow properties of crude oil, lubricating oil or fuel oil, of an additive defined in the third aspect.

In a sixth aspect, the invention provides a concentrate comprising an additive as defined in the third aspect in dispersion in a liquid medium compatible with a crude oil, lubricating oil or fuel oil.

In a seventh aspect, the invention provides a method for improving the cold flow properties of lubricating oil or fuel oil comprising the incorporation therein of an additive as defined in the second aspect.

The features of invention will now be discussed in further detail as follows.

POLYMER

In the first, third, fifth and sixth aspects of this invention, said polymer may, for example, comprise a homopolymer derived from an alpha-olefin of the formula $CH_2=CHR^1$ wherein R¹ is a straight or substantially straight chain aliphatic group (i.e. a small amount of branching may be present) having at least 6 carbon atoms. Alternatively, the polymer may comprise a copolymer derived essentially from a first alpha-olefin of the formula $CH_2=CHR^1$ wherein R¹ is a straight or substantially straight chain aliphatic group (i.e. a small amount of branching may be present) having at least 6 carbon atoms and a second alpha-olefin of the formula $CH_2=CHR^2$ wherein R² is hydrogen or a straight or branched chain aliphatic hydrocarbyl group that is different from R¹ and, for example, has up to 16 carbon atoms provided that, where R² is hydrogen, the polymer does not contain more than 40 mole %, preferably not more than 20 mole % of ethylene. Advantageously, the polymer may contain no ethylene to maximise the level of tacticity. Thus, R² may differ from R¹ in terms of its number of carbon atoms and chemical structure. Preferably R¹ and R² differ in carbon number.

By "copolymer" is meant a polymer derived from two or more monomers.

By "hydrocarbyl" is meant an organic moiety containing hydrogen and carbon having a carbon atom directly attached to the rest of the molecule and which may be aliphatic, including alicyclic; and which may contain one or more hetero-atoms provided they do not interfere with the essentially hydrocarbyl nature of the moiety.

More preferably R¹ is a straight chain alkyl group, for example having from 6 to 16 carbon atoms, and may include mixtures thereof. Examples of R¹ are hexyl, octyl, decyl, dodecyl, tridecyl, tetradecyl, pentadecyl and hexadecyl, all of which have straight chains.

More preferably R² is a straight chain alkyl group, having up to 16 carbon atoms and may include mixtures thereof. R² may, for example, have two, or fewer than two, carbon atoms less than R¹. Examples of R² are decyl, nonyl, octyl, heptyl, and hexyl, all of which have straight chains.

In the second, fourth and seventh aspects of this invention, R¹ is preferably a straight chain alkyl group having at least 6 carbon atoms, for example having from 6 to 40 carbon atoms, preferably 6 to 18 carbon atoms, and most preferably 6 to 16 carbon atoms and may include mixtures thereof. Examples of suitable R¹ are hexyl, octyl, decyl, dodecyl, tridecyl, tetradecyl, pentadecyl, hexadecyl, heptadecyl and octadecyl, all of which have straight chains. R² is preferably a straight chain alkyl group having up to 30 carbon atoms and preferably up to 16 carbon atoms and may include mixtures thereof. R² may, for example, have two, or fewer than two, carbon atoms less than R¹. Examples of R² are hexadecyl, tetradecyl, dodecyl, decyl, nonyl, octyl, heptyl, and hexyl, all of which have straight chains.

In all aspects of this invention where the polymer is the copolymer, particularly preferred are polymers in which the pendant R¹ and R² groups consist essentially of n-octyl and n-tetradecyl groups, or n-octyl and n-hexadecyl groups. As will readily be apparent to the man skilled in the art, such polymers may be prepared from comonomers in which R¹ is n-octyl and R² is n-hexadecyl, or vice versa, to equal advantage.

Number average molecular weight in relation to all aspects of this invention means as measured by Gel Permeation Chromatography. In all aspects, preferably it is from 300 to 15000, more preferably from 500 to 8000, most preferably from 400 to 5000. An advantageous lower limit of number average molecular weight may be 1000 or 1250.

Also in relation to all aspects of this invention, the isotacticity of the polymer is preferably 80% or greater. Isotacticity in this specification is as measured by $C^{13}$ NMR. Isotacticity may be measured by other methods, such as are known in the art, and which may give slightly different results from $C^{13}$ NMR.

The polymer may be prepared as described in U.S. Pat. No. 4,668,834, EP-A-1 28,046 and 129,368, and EP-A-0, 260,999.

In greater detail, the polymers for use in the aforementioned aspects of the present invention are obtainable by polymerising monomer mixtures comprising appropriate monomers in the presence of a catalyst system comprising at least one metallocene (e.g. a cyclopentadienyl-transition metal compound) and an alumoxane compound. The comonomer content may be controlled through the selection of the monomer mixture feed.

The catalyst employed in the production of the polymers are organometallic coordination compounds which are cyclopentadienyl derivatives of a Group 4b metal of the Periodic Table of the Elements (56th Edition of Handbook of Chemistry and Physics, CRC Press (1975)) and include mono- and di-cyclopentadienyls and their derivatives of the transition metals. Particularly desirable are the metallocenes of a Group 4b metal such as titanium, zirconium and hafnium. The alumoxanes employed in forming the reaction product with the metallocenes are themselves the reaction products of an aluminum trialkyl with water.

In general, at least one metallocene compound is employed in the formation of the catalyst. As indicated above a metallocene is a metal derivative of a cyclopentadiene. The metallocenes usefully employed in accordance with this invention contain at least one cyclopentadiene ring. The metal is selected from Group 4b preferably titanium, zirconium, and hafnium, and most preferably hafnium and zirconium. The cyclopentadienyl ring can be unsubstituted or contain one or more substituents (e.g. from 1 to 5 substituents) such as, for example, a hydrocarbyl substituent (e.g. up to 5 $C_1$ to $C_5$ hydrocarbyl substituents) or other substituents, e.g. such as, for example, a trialkyl silyl substituent. The metallocene can contain one or two cyclopentadienyl rings; however, two rings are preferred.

Useful metallocenes can be represented by the general formulas:

$(Cp)_m MR_n X_q$   I.

wherein Cp is a cyclopentadienyl ring, M is a Group 4b transition metal, R is a hydrocarbyl group or hydrocarboxy group having from 1 to 20 carbon atoms, X is a halogen, and m is a whole number from 1 to 2, n is a whole number from 0 to 2, and q is a whole number from 0 to 2.

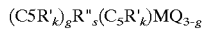
$(C5R'_k)_g R''_s (C_5R'_k) MQ_{3-g}$   II.

and

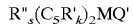
$R''_s(C_5R'_k)_2 MQ'$   III.

wherein $(C_5R'_k)$ is a cyclopentadienyl or substituted cyclopentadienyl.

Some preferred metallocenes are dimethylsilyl-dicyclopentadienyl titanium dichloride; bis(indenyl) zirconium dichloride; bis((4,5,6,7-tetra-hydro)indenyl) zirconium dichloride; the racemic isomer of a 1,2-ethylene-bridged bis(4,5,6,7-tetrahydro-indenyl)zirconium dichloride; the racemic isomer of 1,1-dimethylsilyl-bridged bis(4,5,6,7-tetrahydroindenyl)zirconium dichloride; and the racemic isomer of 1,1-dimethylsilyl-bridged bis (methylcyclopentadienyl)zirconium dichloride. Racemic forms may be separated from corresponding meso forms by methods known in the art.

The alumoxane compounds useful in the polymerisation process may be cyclic or linear. Cyclic alumoxanes may be represented by the general formula $(R—Al—O)_n$ while linear alumoxanes may be represented by the general formula $R(R—Al—O)_n'AlR_2$. In the general formula R is a $C_1$–$C_5$ alkyl group such as, for example, methyl, ethyl, propyl, butyl and pentyl, n is an integer of from 3 to 20, and n' is an integer from 1 to about 20. Preferably, R is methyl and n and n' are 4–18. Generally, in the preparation of alumoxanes from, for example, aluminum trimethyl and water, a mixture of the linear and cyclic compounds is obtained.

The alumoxanes can be prepared in various ways. Preferably, they are prepared by contacting water with a solution of aluminum trialkyl, such as, for example, aluminium trimethyl, in a suitable organic solvent such as toluene or an aliphatic hydrocarbon. For example, the aluminum alkyl is treated with water in the form of a moist solvent. In an alternative method, the aluminum alkyl such as aluminum trimethyl can be desirably contacted with a hydrated salt such as hydrated copper sulfate or ferrous sulfate. Preferably, the alumoxane is prepared in the presence of a hydrated ferrous sulfate. The method comprises treating a dilute solution of aluminum trimethyl in, for example, toluene, with ferrous sulfate represented by the formula $FeSO_4.7H_2O$. The ratio of ferrous sulfate to aluminum trimethyl is desirably about 1 mole of ferrous sulfate for 6 to 7 moles of aluminum trimethyl. The reaction is evidenced by the evolution of methane.

The mole ratio of aluminum in the alumoxane to total metal in the metallocenes which can be usefully employed can be in the range of about 0.5:1 to about 1000:1, and desirably about 1:1 to about 500:1. Preferably, the mole ratio will be in the range of 250:1 to about 5:1.

The solvents used in the preparation of the catalyst system are inert hydrocarbons, in particular a hydrocarbon that is inert with respect to the catalyst system. Such solvents are well known and include, for example, isobutane, butane, pentane, hexane, heptane, octane, cyclohexane, methylcyclohexane, toluene, xylene and the like.

Polymerisation is generally conducted in an inert and anhydrous atmosphere at temperatures ranging between about 20° C. and about 300° C., preferably between about 30° C. and about 120° C. Reaction time is not critical and may vary from several hours or more to several minutes or less, depending upon factors such as reaction temperature, the monomers to be copolymerised, and the like. One of ordinary skill in the art may readily obtain the optimum reaction time for a given set of reaction parameters by routine experimentation.

The catalyst systems described herein are suitable for the polymerisation of olefins in solution over a wide range of pressures. Preferably, the polymerisation will be completed at atmospheric or pressure from about 10 bar to about 30 bar.

After polymerisation and, optionally, deactivation of the catalyst (e.g. by conventional techniques such as contacting the polymerisation reaction medium with water or an alcohol, such as methanol, propanol or isopropanol, or cooling or flashing the medium to terminate the polymerisation reaction), the product polymer can be recovered by processes well known in the art. Any excess reactants may be flashed off from the polymer.

The polymerisation may be conducted employing liquid monomer, such as liquid propylene, or mixtures of liquid monomers (such as mixtures of liquid propylene, 1-butene, octene-1, and octadecene-1), as the reaction medium. Alternatively, polymerisation may be accomplished in the presence of a hydrocarbon inert to the polymerisation such as butane, pentane, isopentane, hexane, isooctane, decane, toluene or xylene.

In those situations wherein the molecular weight of the polymer product that would be produced at a given set of operating conditions is higher than desired, any of the techniques known in the prior art for control of molecular weight, such as the use of hydrogen and/or polymerisation temperature control, may be used in the process of this invention. If so desired, the polymerisation may be carried out in the presence of hydrogen to lower the polymer molecular weight. The polymers may have terminal ethenylidene unsaturation not less than about 30% of the polymer chains.

OIL (WHERE PRESENT)

The oil may be a crude oil, i.e. oil obtained directly from drilling and before refining, the compounds of this invention being suitable for use as flow improvers or dewaxing aids therein.

The oil may be a lubricating oil which may be an animal, vegetable or mineral oil, such as petroleum oil fractions ranging from naphthas or spindle oil to SAE 30 lubricating oil grades, castor oil, fish oils or oxidised mineral oil. Such an oil may contain additives depending on its intended use; examples are viscosity index improvers such as ethylene-propylene copolymers, succinic acid based dispersants, metal containing dispersant additives and zinc dialkyldithiophosphate antiwear additives. The compounds of this invention may be suitable for use in lubricating oils as flow improvers cloud point depressants, pour point depressants or dewaxing aids.

The oil may be mineral fuel oil, suitably a middle distillate fuel oil. Such distillate fuel oils generally boil within the range of about 110° C. to about 500° C., e.g. 150° to about 400° C. The fuel oil can comprise atmospheric distillate or vacuum distillate, or cracked gas oil or a blend in any proportion of straight run and thermally and/or catalytically cracked distillates, or may be a vegetable oil. The most common petroleum distillate fuels are kerosene, jet fuels, diesel fuels, heating oils and heavy fuel oils. The heating oil may be a straight atmospheric distillate, or it may contain minor amounts, e.g. up to 35 wt %, of vacuum gas oil or cracked gas oils or of both. Low temperature flow problems are frequently encountered with diesel fuels and with heating oils.

Also, the fuel oil may have a sulphur concentration of 0.2% by weight or less based on the weight of the fuel. Preferably, the sulphur concentration is 0.05% by weight or less, more preferably 0.01% by weight or less. The art describes methods for reducing the sulphur concentration of hydrocarbon middle distillate fuels, such methods including solvent extraction, sulphuric acid treatment, and hydrodesulphurisation.

Alternatively, the oil may be derived from animal or vegetable material. Examples of such oils are rapeseed oil, coriander oil, soyabean oil, cottonseed oil, sunflower oil, castor oil, olive oil, peanut oil, maize oil, almond oil, palm kernel oil, coconut oil, mustard seed oil, beef tallow and fish oils. Further examples include oils derived from corn, jute, sesame, shea nut, ground nut and linseed and may be derived therefrom by methods known in the art. Rapeseed oil, which is a mixture of fatty acids partially esterified with glycerol, is preferred as it is available in large quantities and can be obtained in a simple way by pressing from rapeseed.

Other suitable oils comprise lower alkyl esters of fatty acids. Commercial mixtures of this kind are obtained for example by cleavage and esterification of animal and vegetable fats and oils by their transesterification with lower aliphatic alcohols. For production of lower alkyl esters of fatty acids it is advantageous to start from fats and oils with high iodine number, such as, for example, sunflower oil, rapeseed oil, coriander oil, castor oil, soyabean oil, cottonseed oil, peanut oil or beef tallow. Lower alkyl esters of fatty acids based on a new variety of rapeseed oil, the fatty acid component of which is derived to more than 80 wt % from unsaturated fatty acids with 18 carbon atoms, are preferred.

Particularly preferred are oils according to this invention capable of being utilised as biofuels. Biofuels, i.e. fuels derived from animal or vegetable material, are believed to be less damaging to the environment on combustion, and are obtained from a renewable source. It has been reported that on combustion less carbon dioxide is formed than is formed by the equivalent quantity of petroleum distillate fuel, e.g. diesel fuel, and very little sulphur dioxide is formed. Certain derivatives of vegetable oil, e.g. those obtained by saponification and re-esterification with a monohydric alkyl alcohol, for example, rapeseed oil methyl ester (RME), may be used as a substitute for diesel fuel.

The concentration of the additive in the oil may for example be 10 to 2,000 ppm or to 1,000 ppm of additive (active ingredient) by weight per weight of fuel, preferably 25 to 500 ppm or to 1,000 ppm, more preferably 100 to 500 ppm.

The additive should be soluble the oil to the extent of at least 1000 ppm by weight per weight of-oil at ambient temperature. However, at least some of the additive may come out of solution near the cloud point of the oil in order to modify the wax crystals that form.

CO-ADDITIVES

The additives of the invention may be used in combination with one or more co-additives for improving the cold flow properties of distillate fuels.

Preferred additives in accordance with the various aspects of this invention are described below.

(i) Comb Polymers

Comb polymers are polymers in which hydrocarbyl groups are pendant from a polymer backbone and are discussed in "Comb-Like Polymers. Structure and Properties", N. A. Plate and V. P. Shibaev, J. Poly. Sci. Macromolecular Revs., 8, p 117to 253 (1974).

Advantageously, the comb polymer is a homopolymer having side chains containing at least 6, and preferably at least 10, carbon atoms or a copolymer having at least 25 and preferably at least 40, more preferably at least 50, molar per cent of units having side chains containing at least 6, and preferably at least 10, carbon atoms.

As examples of preferred comb polymers there may be mentioned those of the general formula

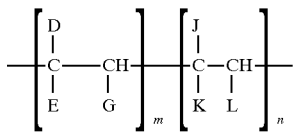

where $D = R^{11}$, $COOR^{11}$, $OCOR^{11}$, $R^{12}COOR^{11}$ or $OR^{11}$ $E = H$, $CH_3$, $D$ or $R^{12}$ $G = H$ or $D$ $J = H$, $R^{12}$, $R^{12}COOR^{11}$, or an aryl or heterocyclic group $K = H$, $COOR^{12}$, $OCOR^{12}$, $OR^{12}$ or $COOH$ $L = H$, $R^{12}$, $COO^{12}$, $OCOR^{12}$ or aryl $R^{11} \geq C_{10}$ hydrocarbyl $R^{12} \geq C_1$ hydrocarbyl and m and n represent mole ratios, m being within the range of from 1.0 to 0.4, n being in the range of from 0 to 0.6. $R^{11}$ advantageously represents a hydrocarbyl group with from 10 to 30 carbon atoms, and $R^{12}$ advantageously represents a hydrocarbyl group with from 1 to 30 carbon atoms.

The comb polymer may contain units derived from other monomers if desired or required. It is within the scope of the invention to include two or more different comb copolymers.

These comb polymers may be copolymers of maleic anhydride or fumaric acid and another ethylenically unsaturated monomer, e.g. an α-olefin or an unsaturated ester, for example, vinyl acetate. It is preferred but not essential that equimolar amounts of the comonomers be used although molar proportions in the range of 2 to 1 and 1 to 2 are suitable. Examples of olefins that may be copolymerized with e.g. maleic anhydride, include 1-decene, 1-dodecene, 1-tetradecene, 1-hexadecene, and 1-octadecene.

The copolymer may be esterified by any suitable technique and although preferred it is not essential that the maleic anhydride or fumaric acid be at least 50% esterified. Examples of alcohols which may be used include n-decan-1-ol, n-dodecan-1-ol, n-tetradecan-1-ol, n-hexadecan-1-ol, and n-octadecan-1-ol. The alcohols may also include up to one methyl branch per chain, for example, 1-methylpentadecan-1-ol, 2-methyltridecan-1-ol. The alcohol may be a mixture of normal and single methyl branched alcohols. It is preferred to use pure alcohols rather than the commercially available alcohol mixtures but if mixtures are used the $R^{12}$ refers to the average number of carbon atoms in the alkyl group; if alcohols that contain a branch at the 1 or 2 positions are used $R^{12}$ refers to the straight chain backbone segment of the alcohol.

These comb polymers may especially be fumarate or itaconate polymers and copolymers such as for example those described in European Patent Applications 153 176, 153 177 and 225 688, and WO 91/16407.

Particularly preferred fumarate comb polymers are copolymers of alkyl fumarates and vinyl acetate, in which the alkyl groups have from 12 to 20 carbon atoms, more especially polymers in which the alkyl groups have 14 carbon atoms or in which the alkyl groups are a mixture of $C_{14}/C_{16}$ alkyl groups, made, for example, by solution copolymerizing an equimolar mixture of fumaric acid and vinyl acetate and reacting the resulting copolymer with the alcohol or mixture of alcohols, which are preferably straight chain alcohols. When the mixture is used it is advantageously a 1:1 by weight mixture of normal $C_{14}$ and $C_{16}$ alcohols. Furthermore, mixtures of the $C_{14}$ ester with the mixed $C_{14}/C_{16}$ ester may advantageously be used. In such mixtures, the ratio of $C_{14}$ to $C_{14}/C_{16}$ is advantageously in the range of from 1:1 to 4:1, preferably 2:1 to 7:2, and most preferably about 3:1, by weight. The particularly preferred fumarate comb polymers may, for example, have a number average molecular weight in the range of 1,000 to 100,000, preferably 1,000 to 30,000, as measured by Vapour Phase Osmometry (VPO).

Other suitable comb polymers are the polymers and copolymers of α-olefins and esterified copolymers of styrene and maleic anhydride, and esterified copolymers of styrene and fumaric acid; mixtures of two or more comb polymers may be used in accordance with the invention and, as indicated above, such use may be advantageous.

(ii) Polyoxyalkylene Compounds

Examples are polyoxyalkylene esters, ethers, ester/ethers and mixtures thereof, particularly those containing at least one, preferably at least two $C_{10}$ to $C_{30}$ linear saturated alkyl groups and a polyoxyalkylene glycol group of molecular weight up to 5,000 preferably 200 to 5,000, the alkyl group in said polyoxyalkylene glycol containing from 1 to 4 carbon atoms. These materials form the subject of European Patent Publication 0 061 895 A2. Other such additives are described in U.S. Pat. No. 4 491 455.

The preferred esters, ethers or ester/ethers which may be used may be structurally depicted by the formula

R—O(A)—O—R² where R and $R^2$ are the same or different and may be

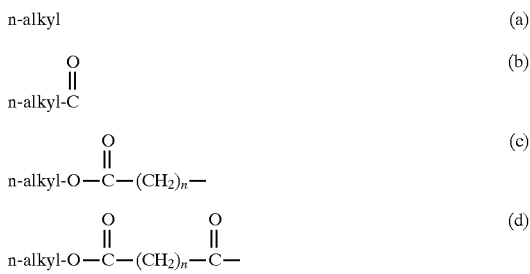

n being, for example, 1 to 30, the alkyl group being linear and saturated and containing 10 to 30 carbon atoms, and A representing the polyalkylene segment of the glycol in which the alkylene group has 1 to 4 carbon atoms, such as a polyoxymethylene, polyoxyethylene or polyoxytrimethylene moiety which is substantially linear; some degree of branching with lower alkyl side chains (such as in polyoxypropylene glycol) may be present but it is preferred that the glycol is substantially linear. A may also contain nitrogen.

Examples of suitable glycols are substantially linear polyethylene glycols (PEG) and polypropylene glycols (PPG) having a molecular weight of about 100 to 5,000, preferably about 200 to 2,000. Esters are preferred and fatty acids containing from 10–30 carbon atoms are useful for reacting with the glycols to form the ester additives, it being preferred to use a $C_{18}$–$C_{24}$ fatty acid, especially behenic acid. The esters may also be prepared by esterifying polyethoxylated fatty acids or polyethoxylated alcohols.

Polyoxyalkylene diesters, diethers, ether/esters and mixtures thereof are suitable as additives, diesters being preferred for use in narrow boiling distillates when minor amounts of monoethers and monoesters (which are often formed in the manufacturing process) may also be present. It is important for additive performance that a major amount of the dialkyl compound is present. In particular, stearic or behenic diesters of polyethylene glycol, polypropylene glycol or polyethylene/polypropylene glycol mixtures are preferred.

Other examples of polyoxyalkylene compounds are those described in Japanese Patent Publication Nos 2-51477 and 3-34790 (both Sanyo), and the esterified alkoxylated amines described in EP-A-1 17,108 and EP-A-326,356 (both Nippon Oil and Fats).

(iii) Ethylene/Unsaturated Ester Copolymers

Ethylene copolymer flow improvers have a polymethylene backbone divided into segments by oxyhydrocarbon side chains, i.e. ethylene unsaturated ester copolymer flow improvers. The unsaturated monomers copolymerisable with ethylene to form the copolymers include unsaturated mono and diesters of the general formula:

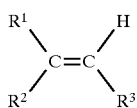

wherein $R^1$ represents hydrogen or a methyl group;
$R^2$ represents a —OOCR⁴ or —COOR⁴ group wherein $R^4$ represents hydrogen or a $C_1$ to $C_{28}$, preferably $C_1$ to $C_{16}$, more preferably a $C_1$ to $C_8$, straight or branched chain alkyl group, provided that $R^4$ does not represent hydrogen when $R^2$ represents —COOR⁴; and
$R^3$ is hydrogen or —COOR⁴.

The monomer, when $R^2$ and $R^3$ are hydrogen and $R^1$ is —OOCR⁴, includes vinyl alcohol esters of $C_1$ to $C_{29}$, preferably $C_1$ to $C_5$, monocarboxylic acids, and preferably $C_2$ to $C_{29}$, more preferably $C_1$ to $C_5$ monocarboxylic acids, most preferably $C_2$ to $C_5$ monocarboxylic acids. Examples of vinyl esters which may be copolymerised with ethylene include vinyl acetate, vinyl propionate and vinyl butyrate or isobutyrate, vinyl acetate and vinyl propionate being preferred. Preferably, the copolymers contain from 5 to 40 wt % of the vinyl ester, more preferably from 10 to 35 wt % vinyl ester [change to molar]. They may also be in the form of mixtures of two copolymers such as those described in U.S. Pat. No. 3,961,916. Preferably, number average molecular weight, as measured by vapour phase osmometry, of the copolymer is 1,000 to 10,000, more preferably 1,000 to 5,000. If desired, the copolymers may be derived from additional comonomers, e.g. they may be terpolymers or tetrapolymers or higher polymers, for example where the additional comonomer is isobutylene or diisobutylene.

Such copolymers may also be made by transesterification, or by hydrolysis and re-esterification, of an ethylene unsaturated ester copolymer to give a different ethylene unsaturated ester copolymer. For example, ethylene vinyl hexanoate and ethylene vinyl octanoate copolymers may be made in this way, e.g. from an ethylene vinyl acetate copolymer.

(iv) Polar Organic, Nitrogen-containing Compounds

The oil-soluble polar nitrogen compound is either ionic or non-ionic and is capable of acting as a wax crystal growth inhibitor in fuels. It comprises for example one or more of the compounds (a) to (c) as follows:

(a) An amine salt and/or amide formed by reacting at least one molar proportion of a hydrocarbyl substituted amine with a molar proportion of a hydrocarbyl acid having 1 to 4 carboxylic acid groups or its anhydride.

Ester/amides may be used containing 30 to 300, preferably 50 to 150 total carbon atoms. These nitrogen compounds are described in U.S. Pat. No. 4,211,534. Suitable amines are usually long chain $C_{12}$–$C_{40}$ primary, secondary, tertiary or quaternary amines or mixtures thereof but shorter chain amines may be used provided the resulting nitrogen compound is oil soluble and therefore normally contains about 30 to 300 total carbon atoms. The nitrogen compound preferably contains at least one straight chain $C_8$ to $C_{40}$, preferably $C_{14}$ to $C_{24}$, alkyl segment.

Suitable amines include primary, secondary, tertiary or quaternary, but preferably are secondary. Tertiary and quaternary amines can only form amine salts. Examples of amines include tetradecyl amine, cocoamine, and hydrogenated tallow amine. Examples of secondary amines include dioctacedyl amine and methyl-behenyl amine. Amine mixtures are also suitable such as those derived from natural materials. A preferred amine is a secondary hydrogenated tallow amine of the formula $HNR^1R^2$ wherein $R^1$ and $R^2$ are alkyl groups derived from hydrogenated tallow fat composed of approximately 4% $C_{14}$, 31% $C_{16}$, 59% $C_{18}$.

Examples of suitable carboxylic acids and their anhydrides for preparing the nitrogen compounds include cyclohexane 1,2 dicarboxylic acid, cyclohexene 1,2 dicarboxylic acid, cyclopentane 1,2 dicarboxylic acid and naphthalene dicarboxylic acid, and 1,4-dicarboxylic acids including dialkyl spirobislactone. Generally, these acids have about 5–13 carbon atoms in the cyclic moiety. Preferred acids useful in the present invention are benzene dicarboxylic acids such as phthalic acid, isophthalic acid, and terephthalic acid. Phthalic acid or its anhydride is particularly preferred. The particularly preferred compound is the amide-amine salt formed by reacting 1 molar portion of phthalic anhydride with 2 molar portions of dihydrogenated tallow amine. Another preferred compound is the diamide formed by dehydrating this amide-amine salt.

Other examples are long chain alkyl or alkylene substituted dicarboxylic acid derivatives such as amine salts of monoamides of substituted succinic acids, examples of which are known in the art and described in U.S. Pat. No. 4 147 520, for example. Suitable amines may be those described above.

Other examples are condensates such as described in EP-A-327,423.

(b) A chemical compound comprising or including a cyclic ring system, the compound carrying at least two substituents of the general formula (I) below on the ring system $$-A-NR^1R^2 \qquad (I)$$

where A is an aliphatic hydrocarbyl group that is optionally interrupted by one or more hetero atoms and that is straight chain or branched, and $R^1$ and $R^2$ are the same or different and each is independently a hydrocarbyl group containing 9 to 40 carbon atoms optionally interrupted by one or more hetero atoms, the substituents being the same or different and the compound optionally being in the form of a salt thereof.

Preferably, A has from 1 to 20 carbon atoms and is preferably a methylene or polymethylene group.

As used in this specification the term "hydrocarbyl" refers to a group having a carbon atom directly attached to the rest of the molecule and having a hydrocarbon or predominantly hydrocarbon character. Examples include hydrocarbon groups, including aliphatic (e.g. alkyl or alkenyl), alicyclic (e.g. cycloalkyl or cycloalkenyl), aromatic, and alicyclic-substituted aromatic, and aromatic-substituted aliphatic and alicyclic groups. Aliphatic groups are advantageously saturated. These groups may contain non-hydrocarbon substituents provided their presence does not alter the predominantly hydrocarbon character of the group. Examples include keto, halo, hydroxy, nitro, cyano, alkoxy and acyl. If the hydrocarbyl group is substituted, a single (mono) substituent is preferred.

Examples of substituted hydrocarbyl groups include 2-hydroxyethyl, 3-hydroxypropyl, 4-hydroxybutyl, 2-ketopropyl, ethoxyethyl, and propoxypropyl. The groups may also or alternatively contain atoms other than carbon in a chain or ring otherwise composed of carbon atoms. Suitable hetero atoms include, for example, nitrogen, sulphur, and, preferably, oxygen.

The cyclic ring system may include homocyclic, heterocyclic, or fused polycyclic assemblies, or a system where two or more such cyclic assemblies are joined to one another and in which the cyclic assemblies may be the same or different; Where there are two or more such cyclic assemblies, the substituents of the general formula (I) may be on the same or different assemblies, preferably on the same assembly. Preferably, the or each cyclic assembly is aromatic, more preferably a benzene ring. Most preferably, the cyclic ring system is a single benzene ring when it is preferred that the substituents are in the ortho or meta positions, which benzene ring may be optionally further substituted.

The ring atoms in the cyclic assembly or assemblies are preferably carbon atoms but may for example include one or more ring N, S or O atom, in which case or cases the compound is a heterocyclic compound.

Examples of such polycyclic assemblies include:

(i) condensed benzene structures such as naphthalene, anthracene, phenanthrene, and pyrene;

(ii) condensed ring structures where none of or not all of the rings are benzene such as azulene, indene, hydroindene, fluorene, and diphenylene oxide;

(iii) rings joined "end-on" such as diphenyl;
(iv) heterocyclic compounds such as quinoline, indole, 2:3 dihydroindole, benzofuran, coumarin, isocoumarin, benzothiophen, carbazole and thiodiphenylamine;
(v) non-aromatic or partially saturated ring systems such as decalin (i.e. decahydronaphthalene), a-pinene, cardinene, and bornylene; and
(vi) three-dimensional structures such as norbornene, bicycloheptane (i.e. norbornane), bicyclooctane, and bicyclooctene.

Each hydrocarbyl group constituting $R^1$ and $R^2$ in the invention (Formula I) may for example be an alkyl or alkylene group or a mono- or poly-alkoxyalkyl group. Preferably, each hydrocarbyl group is a straight chain alkyl group. The number of carbon atoms in each hydrocarbyl group is preferably 16 to 40, more preferably 16 to 24.

Also, it is preferred that the cyclic system is substituted with only two substituents of the general formula (I) and that A is a methylene group.

Examples of salts of the chemical compounds are the acetate and the hydrochloride.

The compounds may conveniently be made by reducing the corresponding amide which may be made by reacting a secondary amine with the appropriate acid chloride; and (c) A condensate of long chain primary or secondary amine with a carboxylic acid-containing polymer.

Specific examples include polymers such as described in GB-A-2,121,807, FR-A-2,592,387 and DE-A-3,941,561; and also esters of telemer acid and alkanoloamines such as described in U.S. Pat. No. 4,639,256; a long chain epoxide/amine reaction product which may optionally be further reacted with a polycarboxylic acid; and the reaction product of an amine containing a branched carboxylic acid ester, an epoxide and a mono-carboxylic acid polyester such as described in U.S. Pat. No. 4,631,071.

(v) Hydrocarbon Polymers

Examples are those represented by the following general formula

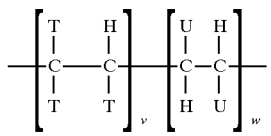

where
T=H or $R^1$
U=H,T or aryl
$R^1$=$C_1$–$C_{30}$ hydrocarbyl
and v and w represent mole ratios, v being within the range 1.0 to 0.0, w being within the range 0.0 to 1.0.

These polymers may be made directly from ethylenically unsaturated monomers or indirectly by hydrogenating the polymer made from monomers such as isoprene and butadiene.

Preferred hydrocarbon polymers are copolymers of ethylene and at least one α-olefin, having a number average molecular weight of at least 30,000. Preferably the α-olefin has at most 20 carbon atoms. Examples of such olefins are propylene, 1-butene, isobutene, n-octene-1, isooctene-1, n-decene-1, and n-dodecene-1. The copolymer may also comprise small amounts, e.g. up to 10% by weight of other copolymerizable monomers, for example olefins other than α-olefins, and non-conjugated dienes. The preferred copolymer is an ethylene-propylene copolymer. It is within the scope of the invention to include two or more different ethylene-α-olefin copolymers of this type.

The number average molecular weight of the ethylene-α-olefin copolymer is, as indicated above, at least 30,000, as measured by gel permeation chromatography (GPC) relative to polystyrene standards, advantageously at least 60,000 and preferably at least 80,000. Functionally no upper limit arises but difficulties of mixing result from increased viscosity at molecular weights above about 150,000, and preferred molecular weight ranges are from 60,000 and 80,000 to 120,000.

Advantageously, the copolymer has a molar ethylene content between 50 and 85 per cent. More advantageously, the ethylene content is within the range of from 57 to 80%, and preferably it is in the range from 58 to 73%; more preferably from 62 to 71%, and most preferably 65 to 70%.

Preferred ethylene-α-olefin copolymers are ethylene-propylene copolymers with a molar ethylene content of from 62 to 71% and a number average molecular weight in the range 60,000 to 120,000, especially preferred copolymers are ethylene-propylene copolymers with an ethylene content of from 62 to 71% and a molecular weight from 80,000 to. 100,000.

The copolymers may be prepared by any of the methods known in the art, for example using a Ziegler type catalyst. Advantageously, the polymers are substantially amorphous, since highly crystalline polymers are relatively insoluble in fuel oil at low temperatures.

The additive composition may also comprise a further ethylene-α-olefin copolymer, advantageously with a number average molecular weight of at most 7500, advantageously from 1,000 to 6,000, and preferably from 2,000 to 5,000, as measured by vapour phase osmometry. Appropriate α-olefins are as given above, or styrene, with propylene again being preferred. Advantageously the ethylene content is from 60 to 77 molar per cent although for ethylene-propylene copolymers up to 86 molar per cent by weight ethylene may be employed with advantage.

Examples of hydrocarbon polymers are described in WO-A-9 111 488.

(vi) Sulphur Carboxy Compounds

Examples are those described in EP-A-0,261,957 which describes the use of compounds of the general formula

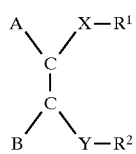

in which
—Y—$R^2$ is $SO_3^{(-)(+)}NR_3^3R^2$, —$SO_3^{(-)(+)}HNR_2^3R^2$,
—$SO_3^{(-)(+)}H_2NR^3R^2$, —$SO_3^{(-)(+)}H_3NR^2$,
—$SO_2NR^3R^2$ or —$SO_3R^2$;
—X—$R^1$ is —Y—$R^2$ or —$CONR^3R^1$,
—$CO_2^{(-)(+)}NF_3^3R^1$, —$CO_2^{(-)(+)}HNR_2^3R^1$,
—$R^4$—$COOR_1$, —$NR^3COR^1$,
—$R^4OR^1$, —$R^4OCOR^1$, —$R^4,R^1$,
—$N(COR^3)R^1$ or $Z^{(-)(+)}NR_3^3R^1$;
–$Z^{(-)}$ is $SO_3^{(-)}$ or —$CO_2^{(-)}$;
$R^1$ and $R^2$ are alkyl, alkoxyalkyl or polyalkoxyalkyl containing at least 10 carbon atoms in the main chain;
$R^3$ is hydrocarbyl and each $R^3$ may be the same or different and $R^4$ is absent or is $C_1$ to $C_5$ alkylene and in

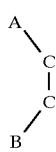

the carbon-carbon (C—C) bond is either a) ethylenically unsaturated when A and B may be alkyl, alkenyl or substituted hydrocarbyl groups or b) part of a cyclic structure which may be aromatic, polynuclear aromatic or cycloaliphatic, it is preferred that X—$R^1$ and Y—$R^2$ between them contain at least three alkyl, alkoxyalkyl or polyalkoxyalkyl groups.

(vii) Hydrocarbylated-Aromatics

These materials are condensates comprising aromatic and hydrocarbyl parts. The aromatic part is conveniently an aromatic hydrocarbon which may be unsubstituted or substituted with, for example, non-hydrocarbon substituents. Such aromatic hydrocarbon preferably contains a maximum of these substituent groups and/or three condensed rings, and is preferably naphthalene. The hydrocarbyl part is a hydrogen and carbon containing part connected to the rest of the molecule by a carbon atom. It may be saturated or unsaturated, and straight or branched, and may contain one or more hetero-atoms provided they do not substantially affect the hydrocarbyl nature of the part. Preferably the hydrocarbyl part is an alkyl part, conveniently having more than 8 carbon atoms. The molecular weight of such condensates may, for example, be in the range of 2,000 to 200,000 such as 2,000 to 20,000, preferably 2,000 to 8,000.

Examples are known in the art, primarily as lube oil pour depressants and as dewaxing aids as mentioned hereinbefore, they may, for example, be made by condensing a halogenated wax with an aromatic hydrocarbon. More specifically, the condensation may be a Friedel-Crafts condensation where the halogenated wax contains 15 to 60, e.g. 16 to 50, carbon atoms, has a melting point of about 200° to 400° C. and has been chlorinated to 5 to 25 wt % chlorine, e.g. 10 to 18 wt %.

Another way of making similar condensates may be from olefins and the aromatic hydrocarbons.

Multicomponent additive systems may be used and the ratios of additives to be used will depend on the fuel to be treated.

CONCENTRATE

The concentrates of the present invention are convenient as a means for incorporating the additive into bulk oil such as distillate fuel, which incorporation may be done by methods known in the art. The concentrates may also contain other additives as required and preferably contain from 3 to 75 wt %, more preferably 3 to 60 wt %, most preferably 10 to 50 wt % of the additives preferably in solution in oil. Examples of carrier liquid are organic solvents including hydrocarbon solvents, for example petroleum fractions such as naphtha, kerosene, diesel and heater oil; aromatic hydrocarbons such as aromatic fractions, e.g. those sold under the 'SOLVESSO' tradename; and paraffinic hydrocarbons such as hexane and pentane and isoparaffins. The carrier liquid must, of course, be selected having regard to its compatibility with the additive and with the fuel.

The additives of the invention may be incorporated into bulk oil by other methods such as those known in the art. If co-additives are required, they may be incorporated into the bulk oil at the same time as the additives of the invention or at a different time.

EXAMPLES

The following are examples of this invention.

Preparation of Polymers

Toluene (91 ml) that had been dried over a molecular sieve was maintained at 70° C. in a resin flask (500 ml) under an atmosphere of nitrogen. Methyl alumoxane (6 ml of a 10% solution) was added to the toluene by means of a syringe and then racemic 1,1-dimethylsilyl-bridged bis(4,5, 6,7-tetrahydroindenyl)zirconium dichloride (6 ml of a 1 mg/ml solution) also added by means of a syringe. A monomer or mixture of monomers that had been dried over a molecular sieve (1.25 moles) was added to the treated toluene drop wise over one hour, the temperature being maintained at 70° C. After 5 hours, the reaction was stopped by adding isopropanol (5 ml).

The molecular weight of the resulting polymers were measured by GPC (Gel Permeation Chromatography) calibrated by poly-isobutylene standards and the isotacticity by $C^{13}$ Nuclear Magnetic Resonance.

The following alpha-olefin polymers were prepared by the above method.

| Reference | C6 AO (mole %) | C14 AO (mole %) | GPC Mn/MWD |
|---|---|---|---|
| 1* | 0 | 100 | 3055/1.46 |
| 2* | 10 | 90 | 2585/1.67 |
| 3 | 20 | 80 | 4196/1.37 |
| 4 | 30 | 70 | 3236/1.69 |
| 5 | 40 | 60 | 2543/1.55 |
| 6 | 50 | 50 | 2607/1.99 |
| 7 | 70 | 30 | 3089/1.62 |
| 8* | 100 | 0 | 2642/1.99 |

| Reference | C6 AO (mole %) | C12 AO (mole %) | GPC $M_n$/MWD |
|---|---|---|---|
| 9 | 0 | 100 | 3039/1.70 |
| 10 | 10 | 90 | 2556/1.87 |
| 11 | 20 | 80 | 2589/2.03 |
| 12 | 30 | 70 | 2660/2.27 |
| 13 | 40 | 60 | 2507/2.22 |
| 14 | 50 | 50 | 2092/2.73 |
| 15 | 70 | 30 | 1792/3.005 |
| 16 | 100 | 0 | 2632/1.83 |

C6 AO, $C_{12}$ AO and C14 AO designate alpha-olefin monomers where ethylene is substituted with a straight chain alkyl group having the indicated number of carbon atoms. Each reference corresponds to an alpha-olefin polymer derived from the alpha-olefin monomer or monomers and in the mole percentages indicated. $\overline{M}_n$ is number average molecular weight and MWD is molecular weight distribution, being defined as the ratio of weight average molecular weight to number average molecular weight.

The polymers having reference numbers 1, 2 and 8 (asterisked) were each found by $C^{13}$ NMR to have isotacticities of at least 80%. The other referenced polymers above would be expected to have similar isotacticities because they were prepared under identical experimental conditions.

Tests

In the tests, the following fuels were used having the stated characteristics.

| Code | Cloud Point (°C.) | Wax Content (%) (10° C. below Cloud Point) | D-86 Distillation (°C.) | | | | |
|------|------|------|------|------|------|------|------|
| | | | IBP | 20% | 50% | 90% | FBP |
| A | -10 | 0.97 | 184 | 231 | 265 | 327 | 357 |
| B | -4  | 1.7  | 172 | 231 | 263 | 322 | 351 |
| C | -5  | 2.2  | 131 | 210 |     | 331 | 367 |
| D | -12 | 3.72 | 189 | 234 | 269 | 314 | 336 |
| E | -14 | 1.72 | 172 | 221 | 256 | 312 | 338 |
| F | -10 | 1.96 | 197 | 238 | 278 | 324 | 325 |
| G | -7  | —    | 190 | 258 | 286 | 329 | 345 |
| H | -10 | 3.13 | 187 | 246 | 274 | 319 | 350 |
| I | -14 | 1.77 | 187 | 232 | 268 | 314 | 319 |

IBP=Initial Boiling Point
FBP=Final Boiling Point
x %=Temperature at which x % of the fuel by volume had distilled.

(A) The polymers were dissolved in middle distillate fuel and the cloud point measured.
The results are summarised as follows:

| Polymer Reference | Treat Rate, ppm (wt/wt) | Fuels | | | | | | |
|---|---|---|---|---|---|---|---|---|
| | | A | B | C | D | E | F | G |
| | | Cloud Point, °C. | | | | | | |
| Base Fuel | 0 | -10 | -4 | -5 | -12 | -14 | -10 | -7 |
| 1 | 280 | -14 | -8 | | | | | |
|   | 500 | -12 | | -8 | | | | |
| 2 | 280 | -16 | -8 | | | | | |
|   | 500 | -15 | | -9 | -15 | -17 | -13 | -8 |
| 3 | 280 | -15 | -7 | | | | | |
|   | 500 | -15 | | -8 | | | | |
| 4 | 280 | -15 | -6 | | | | | |
|   | 500 | -15 | | -6 | | | | |
| 5 | 280 | -13 | -5 | | | | | |
|   | 500 | -14 | | -5 | | | | |
| 6 | 280 | -12 | -5 | | | | | |
|   | 500 | -11 | | -5 | | | | |
| 7 | 280 | -11 | -5 | | | | | |
|   | 500 | -11 | | -4 | | | | |
| 8 | 280 | -12 | -5 | | | | | |
|   | 500 | -13 | | -5 | | | | |

It is therefore seen that the polymers of this invention are effective Cloud Point Depressants.

(B) Polymers reference 2 of the invention was also compared with a comparison (known) cold flow additive for cloud point and low temperature filterability performance according to ASTM D4539. The results are summarised as follows.

| Additive | Fuel | | | | | | | |
|---|---|---|---|---|---|---|---|---|
| | B | | A | | H | | I | |
| | CP | LTFT | CP | LTFT | CP | LTFT | CP | LTFT |
| Untreated | -4 | -6 | -10 | -11 | -10 | -11 | -14 | -19 |
| Comparison | -5.4 | -7 | -12.8 | -13 | -12.1 | -12 | -16.3 | -18 |
| Polymer Ref 2 | -8.9 | -9 | -17.4 | -16 | -14.4 | -14 | -19.4 | -19 |

KEY
CP = Cloud Point (°C.) - auto cloud point
LTFT = Low Temperature Filterability Test (°C.)
Treat Rate = 150 ppm (wt/wt)
Fuels A, B, F and G correspond to fuels used in Test (A)
Comparison Additive a C12/14 fumarate/vinyl acetate copolymer of $M_n$ of about 5,000 (as measured by GPC).

The comparison additive, being synthesised via a free-radical polymerisation reaction and thus under conditions of low stereoselectivity, displays very low levels of isotacticity.

In each case, the fuel contained, additionally, 150 ppm of a N,N-dialkyl ammonium salt of 2-N',N'-dialkylamidobenzoate, being the reaction product of reacting one mole of phthalic anhydride with two moles of dihydrogenated tallow amine to form a half amide/half amine salt, and 75 ppm of an ethylene-vinyl acetate copolymer having a vinyl acetate content of about 37% by weight and a number average molecular weight of about 2,600 measured by VPO (Vapour Phase Osmometry).

The results show that the polymer of the invention improves performance when compared with the comparison additive.

We claim:

1. A composition comprising a major proportion of a lubricating oil or fuel oil and 20 to 2000 ppm by weight of an additive comprising a homo- or copolymer having a number average molecular weight of up to 15,000 and an isotacticity of 75% or greater; said homopolymer or copolymer being prepared using a catalyst system comprising at least one metallocene cyclopentadienyl derivative of a Group 4b metal of the Periodic Table of the Elements and an alumoxane; said homopolymer being derived essentially from an alpha-olefin monomer of formula (I):

$$CH_2=CHR^1 \qquad (I)$$

wherein $R^1$ is an aliphatic hydrocarbyl group having 6 to 16 carbon atoms, but not n-hexadecyl; said copolymer being derived essentially from a first alpha-olefin monomer of formula (I) wherein $R^1$ is as defined above and one or more additional alpha-olefin monomers each independently of formula (II):

$$CH_2=CHR^2 \qquad (II)$$

wherein $R^2$ is an aliphatic hydrocarbyl group having 6 to 16 carbon atoms, but not n-hexadecy and being different from $R^1$, said additive improving the cold flow properties of said oil.

2. A composition according to claim 1 wherein said additive comprises the copolymer, wherein $R^1$ is a straight or substantially straight chain aliphatic group.

3. A composition according to claim 2, wherein $R^1$ and $R^2$ consist essentially of n-hexyl and n-tetradecyl groups, or n-hexyl and n-dodecyl groups.

* * * * *